United States Patent
Liu et al.

(10) Patent No.: US 12,048,046 B2
(45) Date of Patent: Jul. 23, 2024

(54) DATA TRANSMISSION METHOD AND APPARATUS, INFORMATION DETERMINATION METHOD AND APPARATUS, AND STORAGE MEDIUM

(71) Applicant: ZTE Corporation, Guangdong (CN)

(72) Inventors: Xu Liu, Shenzhen (CN); Bo Dai, Shenzhen (CN); Ting Lu, Shenzhen (CN); Xiubin Sha, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 345 days.

(21) Appl. No.: 17/707,261

(22) Filed: Mar. 29, 2022

(65) Prior Publication Data

US 2022/0272788 A1    Aug. 25, 2022

Related U.S. Application Data

(63) Continuation of application No. PCT/CN2020/118245, filed on Sep. 28, 2020.

(30) Foreign Application Priority Data

Sep. 29, 2019 (CN) .......................... 201910936293.7

(51) Int. Cl.
*H04W 76/27* (2018.01)
*H04W 68/02* (2009.01)

(52) U.S. Cl.
CPC ........... *H04W 76/27* (2018.02); *H04W 68/02* (2013.01)

(58) Field of Classification Search
CPC .............................. H04W 76/27; H04W 68/02
See application file for complete search history.

(56) References Cited

U.S. PATENT DOCUMENTS

| 10,932,121 B2 | 2/2021 | Kim et al. |
| 2018/0359786 A1 | 12/2018 | Phuyal et al. |
| 2019/0090190 A1 | 3/2019 | Liu et al. |
| 2019/0104553 A1* | 4/2019 | Johansson ......... H04W 74/0833 |

(Continued)

FOREIGN PATENT DOCUMENTS

| CN | 108024221 A | 5/2018 |
| CN | 108024314 A | 5/2018 |

(Continued)

OTHER PUBLICATIONS

Second Office Action for corresponding Chinese application No. 202211357575.X dated Sep. 29, 2023, including English language translation (10p).

(Continued)

*Primary Examiner* — Curtis B Odom
(74) *Attorney, Agent, or Firm* — Crowell & Moring LLP (57) ABSTRACT

Provided are a data transmission method and apparatus, an information determination method and apparatus, and a storage medium. The data transmission method includes sending a paging message carrying first indication information to a second communication node, where the first indication information is used for indicating whether the second communication node is triggered to perform a mobile terminal-early data transmission (MT-EDT) procedure, and receiving a radio resource control (RRC) message carrying second indication information and sent by the second communication node.

12 Claims, 8 Drawing Sheets

(56) References Cited

U.S. PATENT DOCUMENTS

| | | |
|---|---|---|
| 2019/0223221 A1 | 7/2019 | Johansson et al. |
| 2019/0261264 A1 | 8/2019 | Lou et al. |
| 2019/0313364 A1 | 10/2019 | Liang et al. |

FOREIGN PATENT DOCUMENTS

| | | |
|---|---|---|
| CN | 109526008 A | 3/2019 |
| CN | 109863783 A | 6/2019 |
| CN | 110012551 A | 7/2019 |
| CN | 110050502 A | 7/2019 |
| CN | 110063085 A | 7/2019 |
| CN | 110650533 A | 1/2020 |
| WO | WO 2019/032222 A1 | 2/2019 |
| WO | WO 2019/134593 A1 | 7/2019 |
| WO | WO 2021/057990 A1 | 4/2021 |

OTHER PUBLICATIONS

First Office Action for corresponding Chinese application No. 202211357575.X dated Jun. 16, 2023, 7p, in Chinese language.

English language translation of First Office Action for corresponding Chinese application No. 202211357575.X dated Jun. 16, 2023.

Extended European Search Report for European application No. 20867702.1 dated Oct. 11, 2023, 9p.

Qualcomm Incorporated, "Establishment Cause Values for EDT in eMTC and NB-IoT", 3GPP TSG-RAN WG2 Meeting #101, R2-1803492, Mar. 2, 2018, 49, GR.

Qualcomm Incoporated, "Email discussion report: [99#45][NB-IoT/MTC] Early data transmission", 3GPP TSG-RAN WG2 Meeting #99bis, R2-1710888, 42p, CZ.

First Examination Report for corresponding application No. IN 202217016635 dated November 18, 2022, 6p, in Indian and English language.

Official Action for corresponding Japanese application No. 2022-519208 dated Jun. 19, 2023, 4p, in Japanese language.

English language translation of Official Action for corresponding Japanese application No. 2022-519208 dated Jun. 19, 2023, 10p.

Intel Corporation, "Details on MT EDT for UP solution (Msg4-based)", 3GPP, TSG RAN WG2, meeting #107, R2-1909544 (revision of R2-1906434), Aug. 30, 2019, 10p, CZ.

International Search Report for priority application No. PCT/CN2020/118245 dated Dec. 30, 2022, 6p, in English and Chinese languages.

Huawei et al., "Overall procedure for M394 based option," 3GPP TSG-RAN WG2 meeting #106 R2-1906154, May 13-17, 2019, 4p, US.

Ericsson, "MT early data in Msg4," 3GPP TSG-RAN WG2 meeting #106 R2-1906929, May 13-17, 2019, 6p, US.

Ericsson, "UE_ID based WUS grouping," 3GPP TSG-RAN W62 meeting #104 R2-1818238, Nov. 12-16, 2018, 4p, US.

Written Opinion for priority application No. PCT/CN2020/118245 dated Dec. 30, 2020, 5p, in Chinese language.

English language translation of the Written Opinion for priority application No. PCT/CN2020/118245 dated Dec. 30, 2020, 5p.

* cited by examiner

Determine a current resource index of each WUS group for a corresponding original resource index of each WUS group based on a preset rule and according to the number of radio frames, a radio frame index, a superframe index, and the number of WUS group resources ~S1010

DATA TRANSMISSION METHOD AND APPARATUS, INFORMATION DETERMINATION METHOD AND APPARATUS, AND STORAGE MEDIUM

RELATED APPLICATION

The present application is a continuation of International Patent Application No. PCT/CN2020/118245, filed Sep. 28, 2020, which claims priority to Chinese Patent Application No. 201910936293.7 filed with the China National Intellectual Property Administration (CNIPA) on Sep. 29, 2019, the disclosure of both of which are incorporated herein by reference in their entireties.

TECHNICAL FIELD

The present application relates to communication, for example, a data transmission method and apparatus, an information determination method and apparatus, and a storage medium.

BACKGROUND

In the physical random access channel (PRACH) process of mobile terminal-early data transmission (MT-EDT), after a base station uses fourth radio resource control (RRC) signaling to complete downlink data transmission, a terminal may be released to the idle state. If the terminal has uplink data to send, the terminal needs to maintain/enter the connected state to complete the sending of uplink data.

In the non-EDT PRACH process, when only a small number of small data packets need to be sent, such a small data packet can be transmitted through one media access control (MAC) control element (CE). After the transmission is completed, a core network only needs to release the context information of the terminal immediately. Accordingly, after data transmission is completed, the connected state of a network cannot be switched to automatically according to service requirements.

SUMMARY

Embodiments of the present application provide a data transmission method and apparatus, an information determination method and apparatus, and a storage medium so that the connected state of a network can be switched to automatically according to service requirements after data transmission is completed.

An embodiment of the present application provides a data transmission method. The method is applied to a first communication node and includes the following.

A paging message carrying first indication information is sent to a second communication node. The first indication information is used for indicating whether the second communication node is triggered to perform a mobile terminal-early data transmission (MT-EDT) procedure.

A radio resource control (RRC) message carrying second indication information and sent by the second communication node is received.

An embodiment of the present application provides a data transmission method. The method is applied to a first communication node and includes the following.

A paging message carrying third indication information and sent by a third communication node is received. The third indication information includes an access network type indication and a core network type indication.

An embodiment of the present application provides a data transmission method. The method is applied to a second communication node and includes the following.

A paging message carrying first indication information and sent by a first communication node is received. The first indication information is used for indicating whether the second communication node is triggered to perform an MT-EDT procedure.

An RRC message carrying second indication information is sent to the first communication node.

An embodiment of the present application provides a data transmission method. The method is applied to a second communication node and includes the following.

A paging message carrying third indication information and sent by a first communication node is received. The third indication information includes an access network type indication and a core network type indication.

An embodiment of the present application provides an information determination method. The method includes the following.

A corresponding WUS group resource index is determined for each WUS group index based on a preset rule and according to the number of radio frames, a radio frame index, a superframe index, and the number of WUS group resources.

An embodiment of the present application provides a data transmission apparatus. The apparatus is applied to a first communication node and includes a first sending module and a first receiving module.

The first sending module is configured to send a paging message carrying first indication information to a second communication node. The first indication information is used for indicating whether the second communication node is triggered to perform an MT-EDT procedure.

The first receiving module is configured to receive an RRC message carrying second indication information and sent by the second communication node. The RRC message includes at least one of the following: the second indication information or a new resumption cause value.

An embodiment of the present application provides a data transmission apparatus. The apparatus is applied to a first communication node and includes a second sending module.

The second sending module is configured to send a paging message carrying third indication information to a second communication node. The third indication information includes an access network type indication and a core network type indication.

An embodiment of the present application provides a data transmission apparatus. The apparatus is applied to a second communication node and includes a second receiving module and a third sending module.

The second receiving module is configured to receive a paging message carrying first indication information and sent by a first communication node. The first indication information is used for indicating whether the second communication node is triggered to perform an MT-EDT procedure.

The third sending module is configured to send an RRC message carrying second indication information to the first communication node.

An embodiment of the present application provides a data transmission apparatus. The apparatus is applied to a second communication node and includes a third receiving module.

The third receiving module is configured to receive a paging message carrying third indication information and sent by a first communication node. The third indication information includes an access network type indication and a core network type indication.

An embodiment of the present application provides an information determination apparatus. The apparatus includes a processor.

The processor is configured to determine a corresponding WUS group resource index for each WUS group index based on a preset rule and according to the number of radio frames, a radio frame index, a superframe index, and the number of wake-up signal (WUS) group resources.

An embodiment of the present application provides a storage medium. The storage medium stores a computer program which, when executed by a processor, causes the processor to perform the method in any one of the preceding embodiments.

DETAILED DESCRIPTION

Embodiments of the present application are described hereinafter in conjunction with drawings. If not in collision, the embodiments described herein and the features thereof can be combined with each other.

In the Release 15 (R15) stage, the narrowband internet of things (NB-IoT)/enhanced machine type communication (eMTC) supports efficient transmission of uplink small data; that is, the transmission is implemented through a mobile original-early data transmission (MO-EDT) procedure. A terminal completes the transmission of uplink data in a random access procedure of early data transmission (EDT); for example, an uplink data packet is carried in a third signaling message. In this random access process, the competition ends, and the acknowledgment of uplink data transmission is completed. In this case, the terminal may end the random access procedure.

In the R16 stage, how to support efficient transmission of downlink small data is considered. That is, the transmission of downlink data in a random access procedure is implemented through a mobile terminal-early data transmission (MT-EDT) procedure. After receiving a paging message issued by a core network, a base station determines whether to trigger the MT-EDT procedure. When the procedure needs to be triggered, the base station carries a non-contention random access resource in the paging message. After receiving a first random access signaling message sent by the terminal, the base station may initially complete the identification of the terminal and then carry a downlink data packet in a second signaling message. Then the terminal sends a third signaling message and completes the acknowledgment of the downlink data packet.

After the transmission and acknowledgment of one data packet are completed through either MO-EDT or MT-EDT, the random access procedure ends and the terminal is released to the idle state. However, to further perform data transmission, it may be necessary to enter the connected state for data transmission and reception after the EDT procedure is performed.

Figure 1:
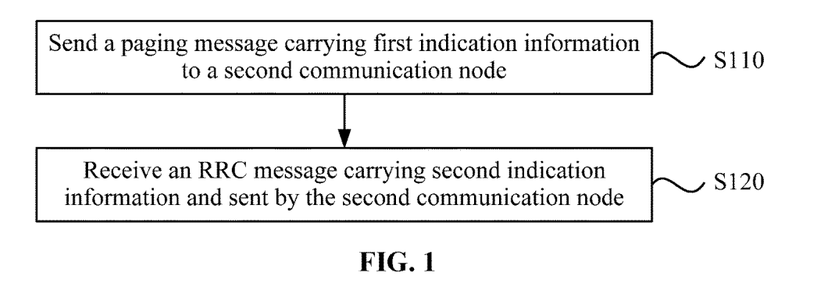
FIG. 1 is a flowchart of a data transmission method according to an embodiment of the present application.

FIG. 1 is a flowchart of a data transmission method according to an embodiment of the present application. This embodiment is performed by a first communication node. In the embodiment, the first communication node is a base station.

As shown in FIG. 1, the data transmission method provided in this embodiment includes S110 to S120.

In S110, a paging message carrying first indication information is sent to a second communication node.

In the embodiment, the first indication information is used for indicating whether the second communication node is triggered to perform an MT-EDT procedure. In the embodiment, the second communication node may be a user equipment (UE).

In S120, a radio resource control (RRC) message carrying second indication information and sent by the second communication node is received.

In one embodiment, the indication manner of the second indication information includes one of the following: an indication through cell extension or an indication through cause value extension. In one embodiment, after receiving the downlink data issued by a third communication node, the first communication node sends the paging message carrying the first indication information to the second communication node to indicate whether the second communication node is triggered to perform the MT-EDT procedure. When the second communication node performs the MT-EDT procedure, the first communication node receives the RRC message sent by the second communication node and indicates, through the second indication information in the RRC message, whether to enter the connected state.

In one embodiment, that the RRC message carrying the second indication information and sent by the second communication node is received includes that in the case where the second communication node is triggered to perform the MT-EDT procedure, a third message carrying the second indication information and sent by the second communication node is received.

In the embodiment, the RRC message includes an original resumption cause value. After receiving the RRC message sent by the UE, the base station cannot determine, based on the original resumption cause value in the RRC, whether the UE can send uplink service data completely within the preset time. The preset time refers to the time when the UE sends the RRC message to a core network. In one embodiment, a new resumption cause value is introduced to the RRC message. By virtue of the new resumption cause value, it is determined whether the base station sends an indication of releasing the context information of the UE to the core network. In the case where the size of the uplink service data sent by the UE to the base station is not large (that is, it is a small data packet) or no uplink service data is uploaded, the RRC message carries the original resumption cause value. In the case where the size of the uplink service data sent by the UE to the base station is large, the RRC message carries the new resumption cause value; that is, after receiving the uplink service data sent by the base station, the core network does not release the context information of the UE. In one embodiment, the second indication information is used for indicating one of the following: the second communication node requests for entering a connected state, whether the second communication node needs to transmit uplink data, whether the MT-EDT procedure is terminated, the second communication node requests for the MT-EDT procedure, acknowledgment information of the MT-EDT procedure, or the second communication node performs uplink data transmission and does not perform the MT-EDT procedure. The small data packet refers to the uplink data whose data size can be reused in one RRC message for transmission.

In one embodiment, the base station broadcasts 1-bit indication signaling in a system information block (SIB) message. The indication signaling is used for indicating whether the UE is allowed to perform an operation. The allowed operation includes a request operation of the UE or an indication operation of the UE. Exemplarily, a request operation of the UE includes but is not limited to a request of the UE for entering the connected state, an operation whether the UE performs uplink data transmission, an operation whether the UE terminates the MT-EDT procedure, a request of the UE for the MT-EDT procedure, the acknowledgment information of the MT-EDT procedure, or an operation that the UE performs uplink data transmission and does not perform the MT-EDT procedure.

In one embodiment, in the process of performing the MT-EDT procedure, it indicates entering the connected state. In the embodiment, the data transmission method is described taking an example in which the first communication node is a base station and the second communication node is a user equipment. After receiving the paging message carrying the first indication information and sent by the core network, the base station determines whether to trigger the MT-EDT procedure. In the case of determining that the MT-EDT procedure needs to be triggered, the base station issues MT-EDT service indication information through the paging message.

In the process where the user equipment performs the MT-EDT procedure, the user equipment makes use of the third message to carry the second indication information in the PRACH process. The second indication information is used for indicating that the UE requests to enter the connected state. Alternatively, the second indication information is used for indicating whether the UE performs uplink data transmission. Alternatively, the second indication information is used for indicating whether the MT-EDT procedure is terminated. Alternatively, the second indication information is used for indicating that the UE requests the MT-EDT procedure. Alternatively, the second indication information is used for indicating the acknowledgment information of the MT-EDT procedure. Alternatively, the second indication information is used for indicating that uplink data transmission is performed and the MT-EDT procedure is not performed.

In the case where the UE prepares to initiate the third message, when an uplink data packet needs to be transmitted, the UE makes use of the third message to carry the affirmation information of the second indication information. That is, the second indication information is used for indicating that the UE requests to enter the connected state; alternatively, the second indication information is used for indicating that the UE performs uplink data transmission; alternatively, the second indication information is used for indicating that the MT-EDT procedure is terminated; alternatively, the second indication information is used for indicating that uplink data transmission is performed and the MT-EDT procedure is not performed.

According to the indication condition of the second indication information of the UE, the base station determines whether the procedure is terminated after a fourth message is sent. That is, when the UE sends the affirmation information of the second indication information, the base station continues to maintain the connected state with the UE after sending the fourth message. Moreover, it is determined whether EDT information is indicated in an S1 interface. That is, when the UE sends the affirmation information of the second indication information, the information of the S1 interface does not include EDT indication information; otherwise, the information of the S1 interface includes EDT indication information.

Figure 2:
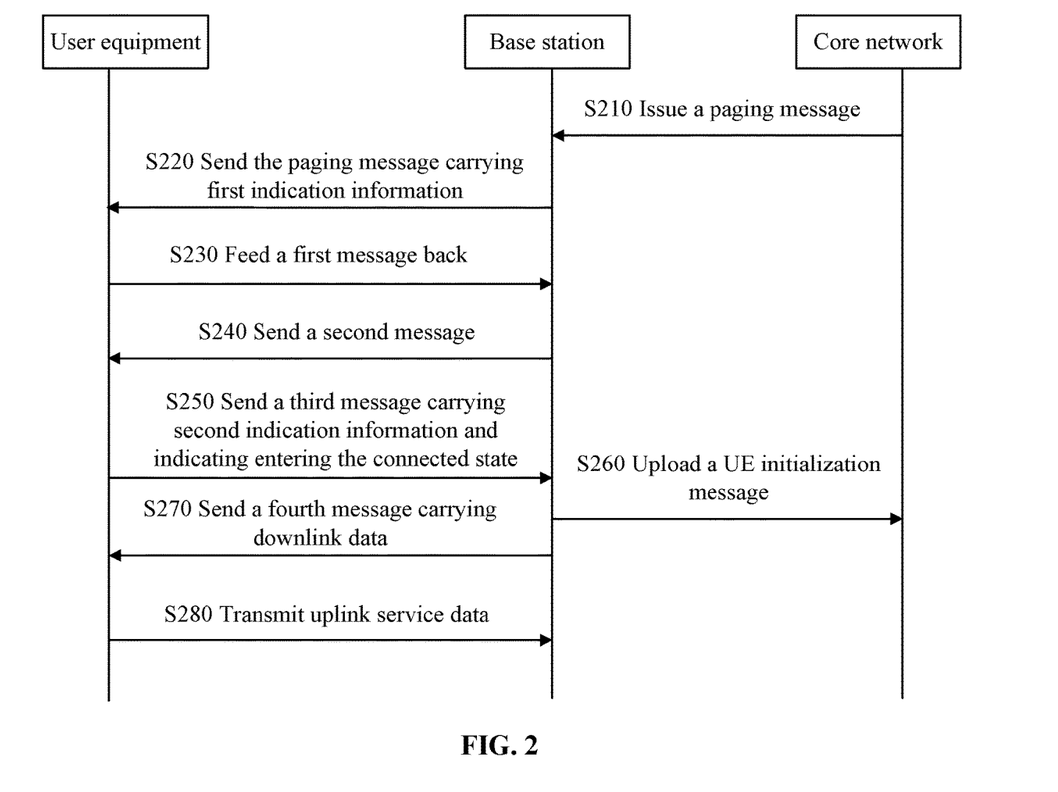
FIG. 2 is a diagram illustrating the interaction of one type of data transmission according to an embodiment of the present application.

In one embodiment, FIG. 2 is a diagram illustrating the interaction of one type of data transmission according to an embodiment of the present application. As shown in FIG. 2, the interaction procedure of data transmission in this embodiment includes S210 to S280.

In S210, a paging message is issued.

In S220, the paging message carrying first indication information is sent.

In S230, a first message (Msg1) is fed back.

In S240, a second message (Msg2) is sent.

In S250, a third message (Msg3) carrying second indication information and indicating entering the connected state is sent.

In S260, a UE initialization message is uploaded.

In S270, a fourth message (Msg4) carrying downlink data is sent.

In S280, uplink service data is transmitted.

In the embodiment, the UE sends the affirmation information carrying the second indication information to the base station. That is, the affirmation information of the second indication information is carried in the third message to indicate entering the connected state. After the base station completes the sending of the Msg4, the transmission of the uplink service data is performed between the UE and the base station.

Figure 3:
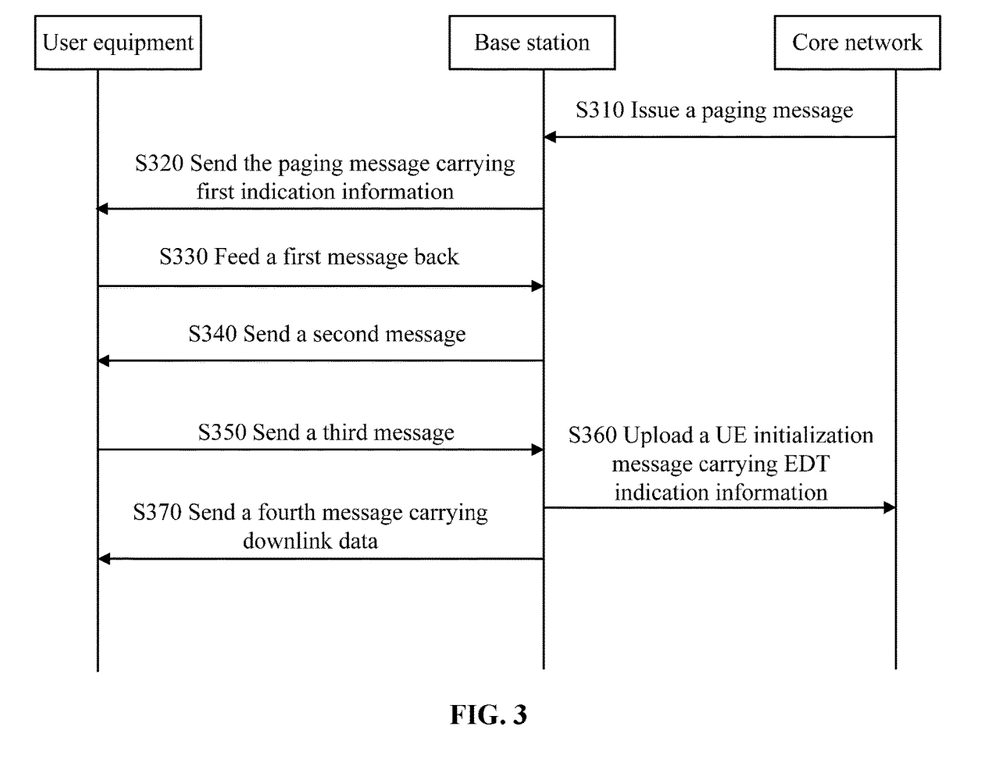
FIG. 3 is a diagram illustrating the interaction of another type of data transmission according to an embodiment of the present application.

In one embodiment, FIG. 3 is a diagram illustrating the interaction of another type of data transmission according to an embodiment of the present application. As shown in FIG. 3, the interaction procedure of data transmission in this embodiment includes S310 to S370.

In S310, a paging message is issued.

In S320, the paging message carrying first indication information is sent.

In S330, a first message is fed back.

In S340, a second message is sent.

In S350, a third message is sent.

In S360, a UE initialization message carrying EDT indication information is uploaded.

In S370, a fourth message carrying downlink data is sent.

In the embodiment, second indication information is not carried in the third message sent by the UE to the base station. Then the EDT indication information is carried in the UE initialization message sent by the base station to the core network to indicate releasing the context of the UE. That is, after the base station completes the sending of the fourth message, the connected state is released and the idle state is entered.

In one embodiment, the determination manner of the second indication information includes one of the following manners: a media access control (MAC) control element (CE) message or an extended RRC message.

In one embodiment, in the case where the second indication information is determined through the MAC CE message, the determination manner of the second indication information includes one of the following manners: a reserved bit of the existing MAC CE message, a new logical channel identity (LCID) in a MAC sub-header, or the indication information of a MAC service data unit (SDU) in the MAC CE.

In the embodiment, in the process of performing the MT-EDT procedure, the second indication information includes two manners. One manner is through a MAC CE. The other manner is through extended RRC signaling; that is, the 1-bit indication information is directly carried in the RRC message.

In one embodiment, the MAC CE, including one idle bit in the existing MAC CE message, is used for indicating whether to enter the connected state. Exemplarily, when the idle bit is 0, it indicates not entering the connected state; when the idle bit is 1, it indicates entering the connected state. In one embodiment, the manner of introducing a new MAC CE through the MAC CE message includes using the sub-header of the MAC CE for reporting (for example, using one idle bit in the sub-header for reporting) and introducing a new logical channel identity (LCD) (that is, selecting one LCID from reserved LCIDs for use). In one embodiment, an indication is performed through the service data unit (SDU) in the MAC CE. The idle bit in the MAC CE header may be an R bit, that is, a reserved bit.

Figure 4:
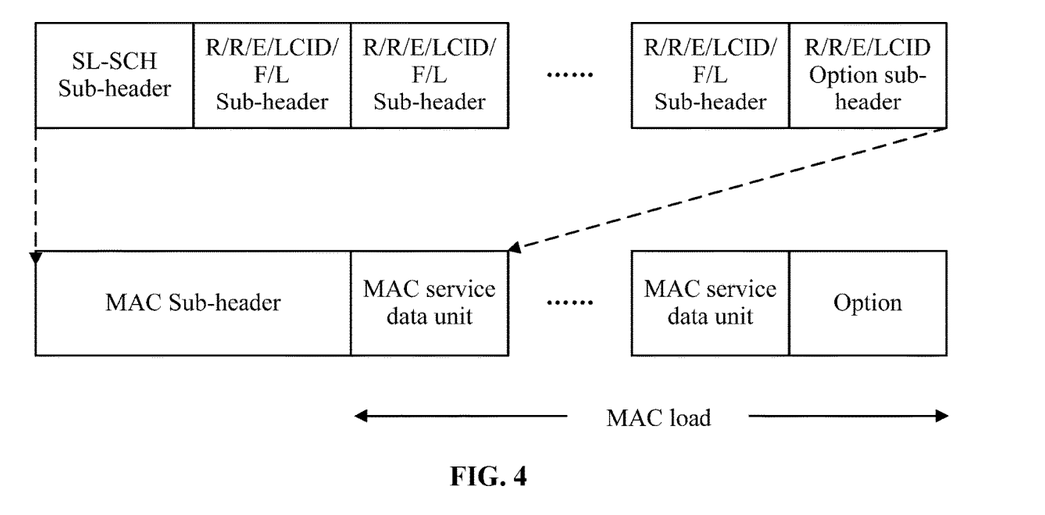
FIG. 4 is a diagram illustrating the structure of a MAC CE according to an embodiment of the present application.

FIG. 4 is a diagram illustrating the structure of a MAC CE according to an embodiment of the present application. As shown in FIG. 4, the indication of the connected state may be performed through the MAC SDU in the MAC CE message.

Table 1 is a table illustrating the format of the sub-header in the MAC CE message. As shown in Table 1, the sub-header in the MAC CE message includes 8 bits. The logical channel identity (LCD) occupies 5 bits. The reserved LCID may be one of 01110, 01111, or 10001.

TABLE 1

A table illustrating the format of the sub-header in the MAC CE message

| Reserved bit | Reserved bit | Extended | Logical channel identity |
|---|---|---|---|

The sub-header in the MAC CE is an 8-bit message including two 1-bit reserved bits (R), one 1-bit extended bit, and a 5-bit LCID. In one embodiment, the second indication information is determined through the LCID.

In one embodiment, in the case where the second indication information is determined through the extended RRC message, the determination manner of the second indication information includes the newly-added cell indication information in the extended RRC message. In the embodiment, the cell indication information is added in the RRC message through the extended RRC message so as to indicate whether to enter the connected state. Exemplarily, when the cell indication information is 1, it indicates entering the connected state; when the cell indication information is 0, it indicates not entering the connected state.

In one embodiment, the third message includes a third message in the conventional physical random access channel (PRACH) process.

Figure 5:
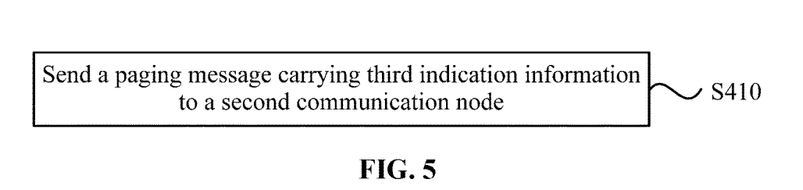
FIG. 5 is a flowchart of another data transmission method according to an embodiment of the present application.

FIG. 5 is a flowchart of another data transmission method according to an embodiment of the present application. As shown in FIG. 5, the data transmission method provided in this embodiment includes S410.

In S410, a paging message carrying third indication information is sent to a second communication node.

The third indication information includes an access network type indication and a core network type indication.

In one embodiment, the data transmission method applied to a first communication node further includes that in the case where the downlink service data sent by a third communication node is received, the paging message carrying the third indication information is sent to the second communication node. The third indication information includes an access network type indication and a core network type indication.

In one embodiment, the core network type indication includes one of the following: an Evolved Packet Core (EPC) indication or a 5th-Generation Core (5GC) indication.

In one embodiment, the access network type indication includes one of the following: an indication for radio access technology (RAT) over which the paging message is currently sent, a long-term evolution (LTE) indication, a narrowband internet of things (NB-IoT) indication, an enhanced machine type communication (eMTC) indication, a new radio (NR) indication, a global system for mobile communications (GSM) indication, or a WIFI indication. The RAT indication of currently sending the paging message is used for indicating the UE to access the cell sending the paging message. In the embodiment, the UE is a multi-mode terminal. That is, the UE supports at least two of the preceding access network type indications.

In one embodiment, in the process of performing the MT-EDT procedure, it indicates accessing a core network type. In the embodiment, the core network transmits the paging message carrying the third indication information to the base station through an S1 interface. The third indication information includes an access network type indication and a core network type indication. After receiving the paging message carrying the third indication information, the base station sends the paging message carrying the third indication to the UE.

Figure 6:
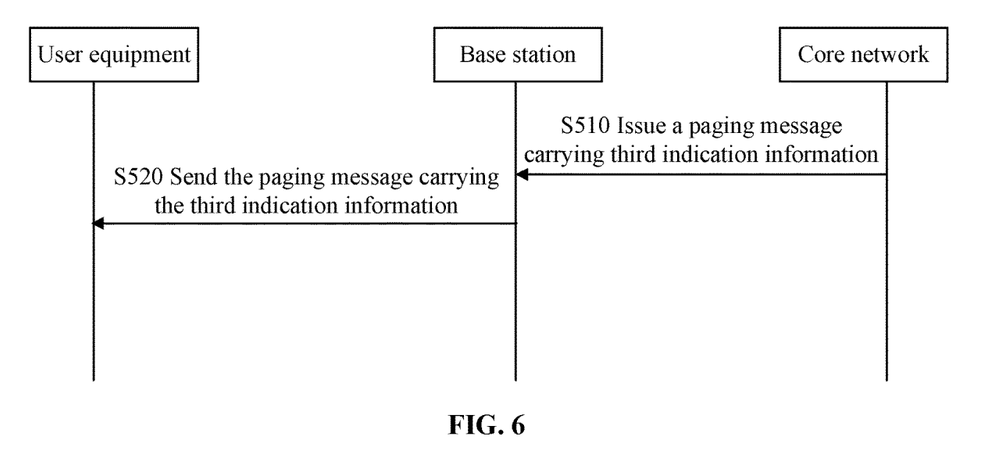
FIG. 6 is a diagram illustrating the interaction of another type of data transmission according to an embodiment of the present application.

In one embodiment, FIG. 6 is a diagram illustrating the interaction of another type of data transmission according to an embodiment of the present application. As shown in FIG. 6, the interaction procedure of data transmission in this embodiment includes S510 to S520.

In S510, a paging message carrying third indication information is issued.

In S520, the paging message carrying the third indication information is sent.

In the embodiment, the core network sends the paging message carrying the third indication information to the base station, and the base station sends the paging message carrying the third indication information to the UE. In the embodiment, when the downlink data issued by the core network reaches the base station, the base station indicates the accessed core network type and/or indicates the network type that the UE accesses.

In one embodiment, the data transmission method applied to a first communication node further includes that in the case where the second communication node is triggered to perform the conventional PRACH process, the downlink data sent by the third communication node is received; and in the case where the transmission manner of the downlink data is EDT, an S1 interface message carrying fourth indication information is sent to the third communication node. The fourth indication information includes an EDT indication.

Figure 7:
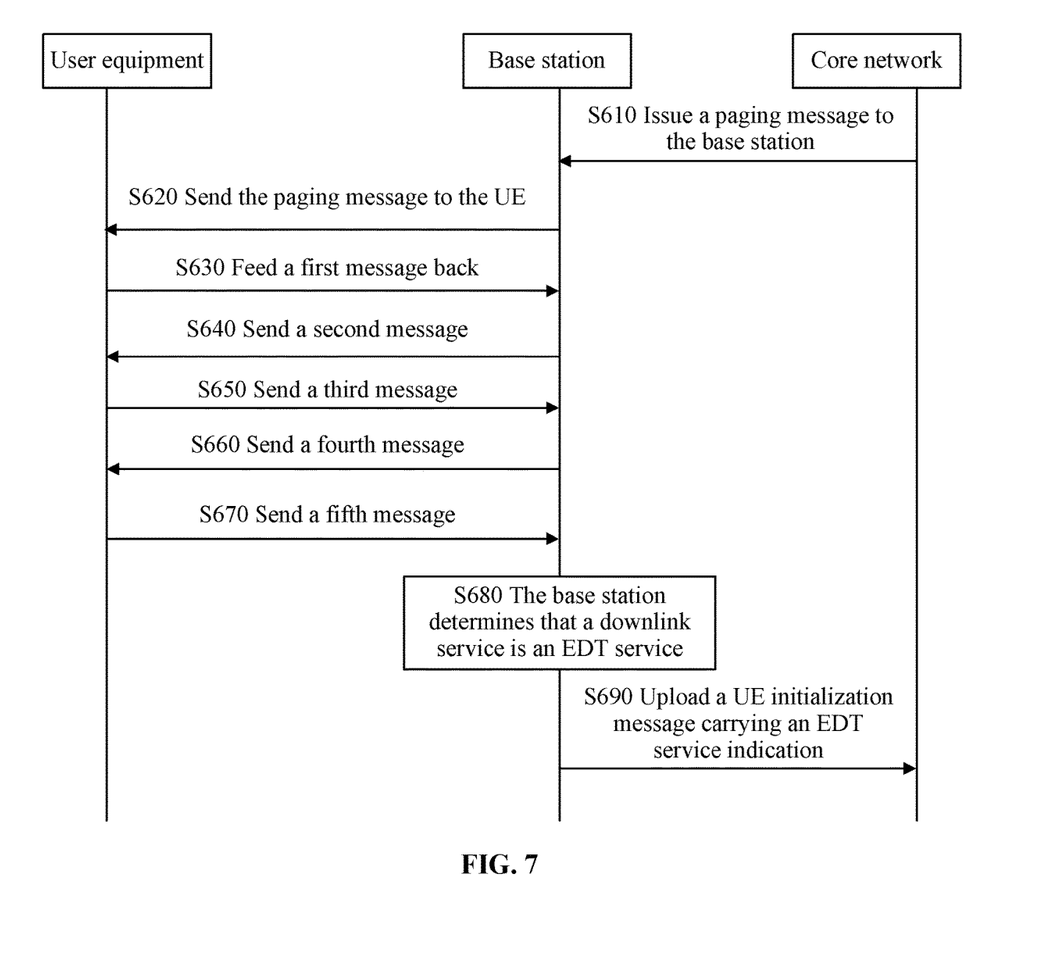
FIG. 7 is a diagram illustrating the interaction of another type of data transmission according to an embodiment of the present application.

In the EDT procedure, an EDT service indicating random access is carried in an RRC message of the S1 interface. In one embodiment, in the non-EDT PRACH process, when a downlink service reaches the base station, the base station determines that the service is in the service type of EDT. That is, only a small number of small data packets need to be sent. Such a small data packet can be transmitted through one MAC PDU. Then in a signaling message of the S1 interface, it is necessary to indicate that the service type is an EDT service. After completing the transmission of the data packet, the core network can release the context information of the terminal immediately. FIG. 7 is a diagram illustrating the interaction of another type of data transmission according to an embodiment of the present application. As shown in FIG. 7, the interaction procedure of data transmission in this embodiment includes S610 to S690.

In S610, a paging message is issued to the base station.
In S620, the paging message is sent to the UE.
In S630, a first message is fed back.
In S640, a second message is sent.
In S650, a third message is sent.
In S660, a fourth message is sent.
In S670, a fifth message (Msg5) is sent.
In S680, the base station determines that a downlink service is an EDT service.
In S690, a UE initialization message carrying an EDT service indication is sent.

When the downlink service reaches the base station, the base station determines whether the downlink service is an EDT service. If the downlink service is an EDT service, the UE initialization message sent by the base station to the core network carries EDT indication information to indicate the core network to release the context of the UE.

In one embodiment, in the case where the second communication node is triggered to perform the conventional PRACH process, an RRC message carrying fourth indication information and sent by the second communication node is received. The fourth indication information includes an EDT indication.

In one embodiment, the RRC message carrying the fourth indication information is one of the following: the third message or the fifth message.

Figure 8:
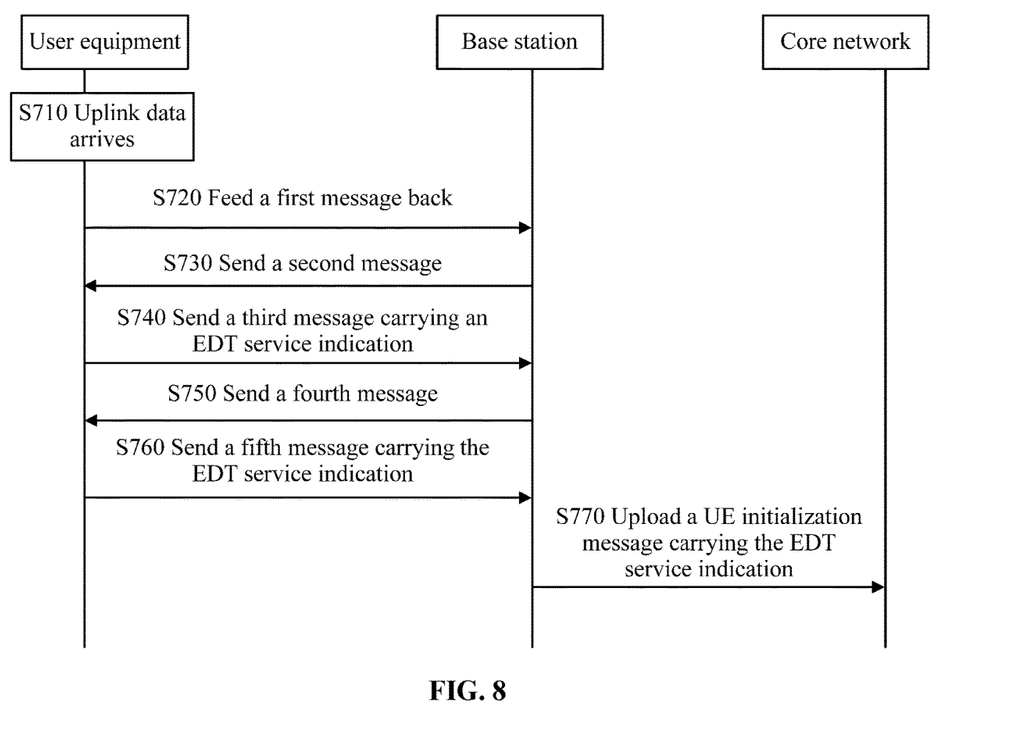
FIG. 8 is a diagram illustrating the interaction of another type of data transmission according to an embodiment of the present application.

FIG. 8 is a diagram illustrating the interaction of another type of data transmission according to an embodiment of the present application. As shown in FIG. 8, the interaction procedure of data transmission in this embodiment includes S710 to S790.

In S710, uplink data arrives.
In S720, a first message is fed back.
In S730, a second message is sent.
In S740, a third message carrying an EDT service indication is sent.
In S750, a fourth message is sent.
In S760, a fifth message carrying the EDT service indication is sent.
In S770, a UE initialization message carrying the EDT service indication is sent.

In one embodiment, the EDT service indication is carried in the Msg3 or Msg5 sent by the UE to the base station so that the base station sends the EDT service indication to the core network. After receiving the EDT service indication, the core network releases the context information of the UE. In the embodiment, in the process of the non-EDT UE triggering the PRACH, the core network is indicated to release the connection. In the embodiment, in the non-EDT PRACH process, in the process of the UE-triggered PRACH procedure, one small data packet can be transmitted through one MAC PDU. Accordingly, only a small number of small data packets need to be sent. The indication information carried in the third signaling message or fifth signaling message of the UE in the PRACH process indicates that the downlink service is an EDT service. After receiving the UE-indicated service, it is necessary to indicate in a signaling message of the S1 interface that the downlink service is an EDT service. After completing the transmission of the data packet, the core network can release the context information of the terminal immediately.

In one embodiment, the base station broadcasts 1-bit indication signaling in a SIB message. The indication signaling is used for indicating whether the UE is allowed to perform an operation. The allowed operation includes a request operation of the UE or an indication operation of the UE. In one embodiment, in the case where the allowed operation is an indication operation of the UE, the indication operation of the UE includes in the case where the second communication node is triggered to perform the conventional PRACH process, receiving an RRC message carrying fourth indication information and sent by the second communication node. The fourth indication information includes an EDT indication. In the embodiment, the UE can receive the RRC message carrying the fourth indication information and sent by the second communication node only in the case where an operation is allowed in the indication of a base station broadcast.

Figure 9:
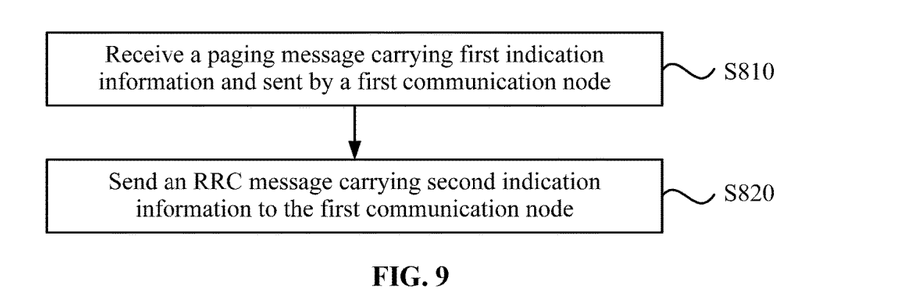
FIG. 9 is a flowchart of another data transmission method according to an embodiment of the present application.

FIG. 9 is a flowchart of another data transmission method according to an embodiment of the present application. This embodiment is performed by a second communication node. The second communication node may be a user equipment. As shown in FIG. 9, the data transmission method provided in this embodiment includes S810 to S820.

In S810, a paging message carrying first indication information and sent by a first communication node is received.

The first indication information is used for indicating whether the second communication node is triggered to perform an MT-EDT procedure.

In S820, an RRC message carrying second indication information is sent to the first communication node.

In the embodiment, after receiving the paging message carrying the first indication information, the second communication node determines whether the second communication node is triggered to perform the MT-EDT procedure. In the case where the second communication node is triggered to perform the MT-EDT procedure, the second communication node sends the RRC message of the affirmation information corresponding to the second indication information to the first communication node.

In one embodiment, that the RRC message carrying the second indication information is sent to the first communication node includes that in the case where the second communication node is triggered to perform the MT-EDT procedure, a third message carrying the second indication information is sent to the first communication node.

In one embodiment, in the case where the second communication node is triggered to perform the conventional PRACH process, an RRC message carrying fourth indication information is sent to the first communication node. The fourth indication information includes an EDT indication.

Figure 10:
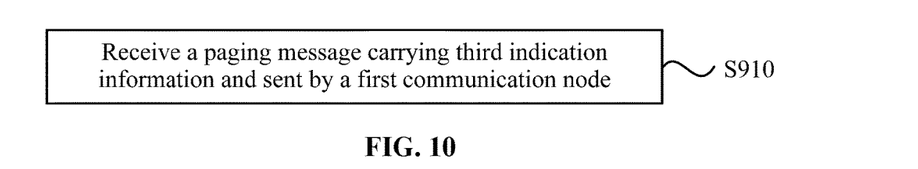
FIG. 10 is a flowchart of another data transmission method according to an embodiment of the present application.

FIG. 10 is a flowchart of another data transmission method according to an embodiment of the present application. This embodiment is performed by a second communication node. The second communication node may be a UE. As shown in FIG. 10, the data transmission method provided in this embodiment includes S910.

In S910, a paging message carrying third indication information and sent by a first communication node is received.

The third indication information includes an access network type indication and a core network type indication.

In the embodiment, the core network issues the paging message carrying the third indication information to the base station, and the base station sends the paging message carrying the third indication information to the UE. Accordingly, based on the paging message carrying the third indication information, the UE determines the type of the network to be accessed.

In one embodiment, the second communication node includes a second communication node of multi-mode.

Figure 11:
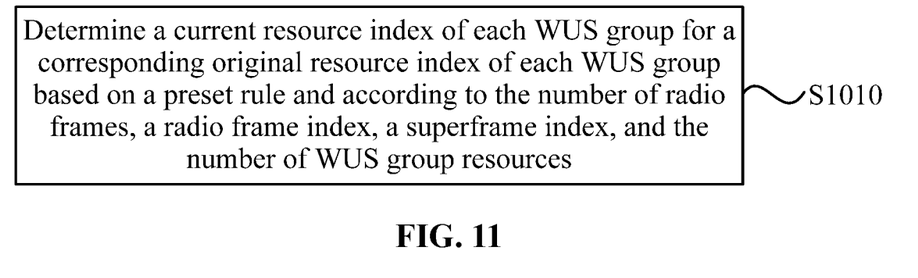
FIG. 11 is a flowchart of an information determination method according to an embodiment of the present application.

FIG. 11 is a flowchart of an information determination method according to an embodiment of the present application. This embodiment may be performed by a second communication node. The second communication node may be a base station. As shown in FIG. 11, the data transmission method provided in this embodiment includes S1010.

In S1010, a current resource index of each WUS group is determined for a corresponding original resource index of each WUS group based on a preset rule and according to the number of radio frames, a radio frame index, a superframe index, and the number of wake-up signal (WUS) group resources.

In one embodiment, the calculation formula of the current resource index of each WUS group is that $M = \mod((A+(SFN\_Index+1024*H\_SFN)/T), K)$.

M denotes the current resource index of each WUS group; A denotes the original resource index of each WUS group; T denotes the number of radio frames included in one discontinuous reception cycle; SFN_Index denotes a radio frame index corresponding to the second communication node in the current paging occasion; H_SFN denotes a superframe index corresponding to the second communication node in the current paging occasion; K denotes the number of WUS group resources; and mod denotes a function for remainder.

In the embodiment, to achieve the fairness of each WUS group, which indicates that the resource index corresponding to each WUS group is dynamic, the relationship between the current resource index of each WUS group and the original resource index of each WUS group may be used for dynamically changing WUS group resources.

The UE determines the position for monitoring a WUS based on the current resource index of the WUS group of the UE. The base station determines a sending resource of each WUS group sequence based on the current resource index of each WUS group.

Figure 12:
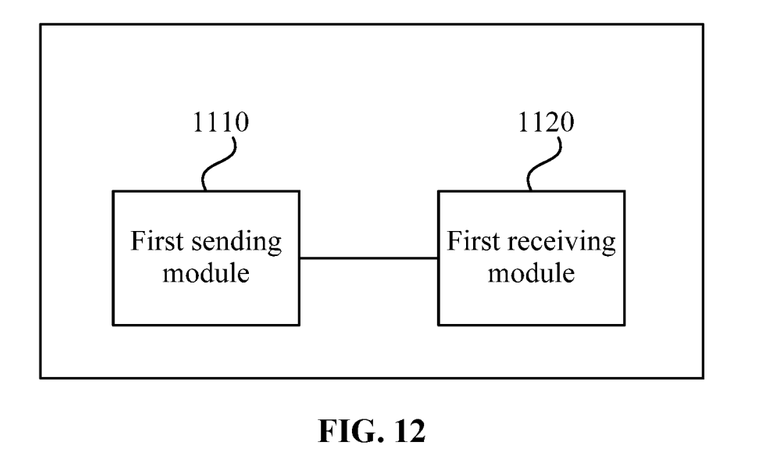
FIG. 12 is a block diagram illustrating the structure of a data transmission apparatus according to an embodiment of the present application.

FIG. 12 is a block diagram illustrating the structure of a data transmission apparatus according to an embodiment of the present application. This embodiment is performed by a first communication node. As shown in FIG. 12, the data transmission apparatus in this embodiment includes a first sending module 1110 and a first receiving module 1120.

The first sending module 1110 is configured to send a paging message carrying first indication information to a second communication node. The first indication information is used for indicating whether the second communication node is triggered to perform an MT-EDT procedure.

The first receiving module 1120 is configured to receive an RRC message carrying second indication information and sent by the second communication node.

The data transmission apparatus provided in this embodiment is configured to perform the data transmission method of the embodiment shown in FIG. 1. The implementation principles and technical effects of the data transmission apparatus provided in this embodiment are similar and are not repeated here.

In one embodiment, the indication manner of the second indication information includes one of the following: an indication through cell extension or an indication through cause value extension.

In one embodiment, the first receiving module includes that in the case where the second communication node is triggered to perform the MT-EDT procedure, a third message carrying the second indication information and sent by the second communication node is received.

In one embodiment, the second indication information is used for indicating one of the following: the second communication node requests for entering a connected state, whether the second communication node needs to transmit uplink data, whether the MT-EDT procedure is terminated, the second communication node requests for the MT-EDT procedure, acknowledgment information of the MT-EDT procedure, or the second communication node performs uplink data transmission and does not perform the MT-EDT procedure.

In one embodiment, the determination manner of the second indication information includes one of the following manners: a MAC CE message or an extended RRC message.

In one embodiment, in the case where the second indication information is determined through the MAC CE message, the determination manner of the second indication information includes one of the following manners: a reserved bit of the existing MAC CE message, a new logical channel identity (LCID) in a MAC sub-header, or the indication information of a MAC service data unit (SDU) in the MAC CE.

In one embodiment, in the case where the second indication information is determined through the extended RRC message, the determination manner of the second indication information includes the newly-added cell indication information in the extended RRC message.

In one embodiment, the third message includes a third message in the conventional physical random access channel (PRACH) process.

Figure 13:
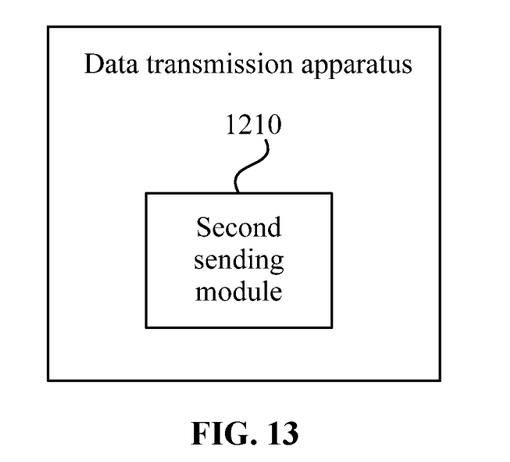
FIG. 13 is a block diagram illustrating the structure of another data transmission apparatus according to an embodiment of the present application.

FIG. 13 is a block diagram illustrating the structure of another data transmission apparatus according to an embodiment of the present application. This embodiment is performed by a first communication node. As shown in FIG. 13, the data transmission apparatus in this embodiment includes a second sending module 1210.

The second sending module 1210 is configured to send a paging message carrying third indication information to a second communication node. The third indication information includes an access network type indication and a core network type indication.

The data transmission apparatus provided in this embodiment is configured to perform the data transmission method of the embodiment shown in FIG. 5. The implementation principles and technical effects of the data transmission apparatus provided in this embodiment are similar and are not repeated here.

In one embodiment, the data transmission apparatus applied to a first communication node further includes a fourth sending module. The fourth sending module is configured to, in the case where the downlink service data sent by a third communication node is received, send the paging message carrying the third indication information to the second communication node. The third indication information includes an access network type indication and a core network type indication.

In one embodiment, the core network type indication includes one of the following: an Evolved Packet Core (EPC) indication or a 5GC indication.

In one embodiment, the access network type indication includes one of the following: an indication for radio access technology (RAT) over which the paging message is currently sent, a long-term evolution (LTE) indication, a narrowband internet of things (NB-IoT) indication, an enhanced machine type communication (eMTC) indication, a new radio (NR) indication, a global system for mobile communications (GSM) indication, or a wireless fidelity (WIFI) indication.

In one embodiment, the data transmission apparatus applied to a first communication node further includes a fourth receiving module and a fifth sending module.

The fourth receiving module is configured to, in the case where the second communication node is triggered to perform the conventional PRACH process, receive the downlink data sent by the third communication node.

The fifth sending module is configured to, in the case where the transmission manner of the downlink data is EDT, send an S1 interface message carrying fourth indication information to the third communication node. The fourth indication information includes an EDT indication.

Figure 14:
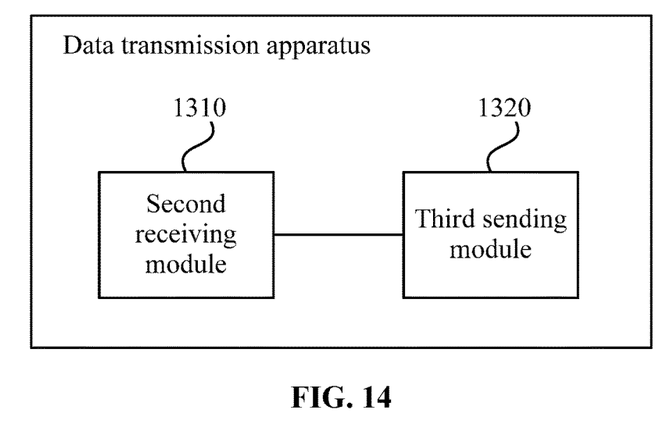
FIG. 14 is a block diagram illustrating the structure of another data transmission apparatus according to an embodiment of the present application.

FIG. 14 is a block diagram illustrating the structure of another data transmission apparatus according to an embodiment of the present application. This embodiment is performed by a second communication node. As shown in FIG. 14, the data transmission apparatus in this embodiment includes a second receiving module 1310 and a third sending module 1320.

The second receiving module 1310 is configured to receive a paging message carrying first indication information and sent by a first communication node. The first indication information is used for indicating whether the second communication node is triggered to perform an MT-EDT procedure.

The third sending module 1320 is configured to send an RRC message carrying second indication information to the first communication node.

The data transmission apparatus provided in this embodiment is configured to perform the data transmission method of the embodiment shown in FIG. 9. The implementation principles and technical effects of the data transmission apparatus provided in this embodiment are similar and are not repeated here.

In one embodiment, as for the third sending module 1320, it includes that in the case where the second communication node is triggered to perform the MT-EDT procedure, a third message carrying the second indication information is sent to the first communication node.

In one embodiment, the data transmission apparatus applied to a second communication node further includes a sixth sending module.

The sixth sending module is configured to, in the case where the second communication node is triggered to perform the conventional PRACH process, an RRC message carrying fourth indication information is sent to the first communication node. The fourth indication information includes an EDT indication.

Figure 15:
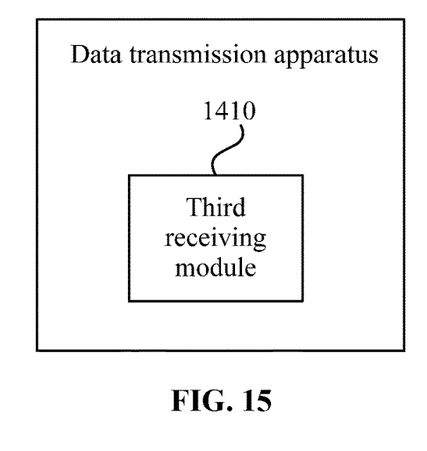
FIG. 15 is a block diagram illustrating the structure of another data transmission apparatus according to an embodiment of the present application.

FIG. 15 is a block diagram illustrating the structure of another data transmission apparatus according to an embodiment of the present application. As shown in FIG. 15, the data transmission apparatus in this embodiment includes a third receiving module 1410.

The third receiving module 1410 is configured to receive a paging message carrying third indication information and sent by a first communication node. The third indication information includes an access network type indication and a core network type indication.

The data transmission apparatus provided in this embodiment is configured to perform the data transmission method of the embodiment shown in FIG. 10. The implementation principles and technical effects of the data transmission apparatus provided in this embodiment are similar and are not repeated here.

In one embodiment, the second communication node includes a second communication node of multi-mode.

Figure 16:
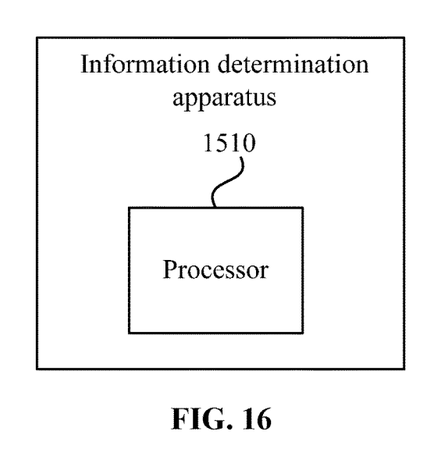
FIG. 16 is a block diagram illustrating the structure of an information determination apparatus according to an embodiment of the present application.

In one embodiment, the data transmission apparatus applied to a second communication node further includes:

FIG. 16 is a block diagram illustrating the structure of an information determination apparatus according to an embodiment of the present application. As shown in FIG. 16, the information determination method provided in this embodiment includes a processor 1510.

The processor 1510 is configured to determine a corresponding WUS group resource index for each WUS group index based on a preset rule and according to the number of radio frames, a radio frame index, a superframe index, and the number of wake-up signal (WUS) group resources.

The information determination apparatus provided in this embodiment is configured to perform the information determination method of the embodiment shown in FIG. 11. The implementation principles and technical effects of the information determination apparatus provided in this embodiment are similar and are not repeated here.

In one embodiment, the calculation formula of the current resource index of each WUS group is that $M = \mod((A + (SFN\_Index + 1024 * H\_SFN)/T), K)$.

M denotes the current resource index of each WUS group; A denotes the original resource index of each WUS group;

T denotes the number of radio frames included in one discontinuous reception cycle; SFN_Index denotes a radio frame index corresponding to the second communication node in the current paging occasion; H_SFN denotes a superframe index corresponding to the second communication node in the current paging occasion; K denotes the number of WUS group resources; and mod denotes a function for remainder.

Figure 17:
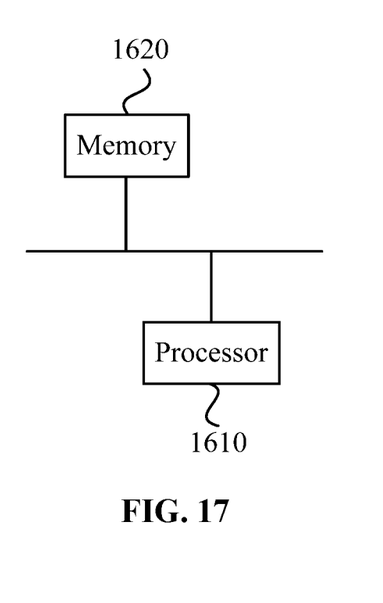
FIG. 17 is a diagram illustrating the structure of a device according to an embodiment of the present application.

FIG. 17 is a diagram illustrating the structure of a device according to an embodiment of the present application. As shown in FIG. 17, the device provided in the present application includes a processor 1610 and a memory 1620. The number of processors 1610 in the device may be one or more, and one processor 1610 is used as an example in FIG. 17. The number of memories 1620 in the device may be one or more, and one memory 1620 is used as an example in FIG. 17. The processor 1610 of the device and the memory 1620 of the device are connected by a bus or in other manners, and the connection by a bus is taken as an example in FIG. 17. In this embodiment, the device is a first communication node.

As a computer-readable storage medium, the memory 1620 may be configured to store software programs, computer-executable programs and modules, such as program instructions/modules (for example, the first sending module and the first receiving module that are in the data transmission apparatus) corresponding to the device according to any embodiment of the present application. The memory 1620 may include a program storage region and a data storage region, where the program storage region may store an operating system and an application program required by at least one function while the data storage region may store data created depending on the use of a device. Additionally, the memory 1620 may include a high-speed random access memory and may further include a non-volatile memory, for example, at least one magnetic disk memory element, flash memory element, or another non-volatile solid-state memory element. In some examples, the memory 1620 may further include memories located remotely relative to the processor 1610, and these remote memories may be connected to the device via a network. Examples of the preceding network include, but are not limited to, the Internet, an intranet, a local area network, a mobile communication network, and a combination thereof.

The preceding device may be configured to perform the data transmission method applied to a first communication node provided in any preceding embodiment and has corresponding functions and effects.

When the device is a second communication node, the program stored in the memory 1620 may be a program instruction/module that corresponds to the data transmission method applied to a second communication node provided in embodiments of the present application. The processor 1610 executes the software programs, instructions, and modules stored in the memory 1620 so as to perform one or more function applications and data processing, that is, to implement the data transmission method applied to a second communication node in the preceding method embodiments. It is to be understood that when the preceding device is a second communication node, the device can perform the data transmission method applied to a second communication node provided in any embodiment of the present application, and has corresponding functions and effects.

When the device is a second communication node, the program stored in the memory 1620 may be a program instruction/module that corresponds to the information determination method applied to a second communication node provided in embodiments of the present application. The processor 1610 executes the software programs, instructions, and modules stored in the memory 1620 so as to perform one or more function applications and data processing, that is, to implement the information determination method applied to a second communication node in the preceding method embodiments. It is to be understood that when the preceding device is a second communication node, the device can perform the information determination method applied to a second communication node provided in any embodiment of the present application, and has corresponding functions and effects.

An embodiment of the present application further provides a storage medium including computer-executable instructions. When executed by a computer processor, the computer-executable instructions cause the processor to perform a data transmission method. The data transmission method is applied to a first communication node. The method includes sending a paging message carrying first indication information to a second communication node, where the first indication information is used for indicating whether the second communication node is triggered to perform an MT-EDT procedure, and receiving an RRC message carrying second indication information and sent by the second communication node.

An embodiment of the present application further provides a storage medium including computer-executable instructions. When executed by a computer processor, the computer-executable instructions cause the processor to perform a data transmission method. The data transmission method is applied to a first communication node. The method includes receiving a paging message carrying third indication information and sent by a third communication node. The third indication information includes an access network type indication and a core network type indication.

An embodiment of the present application further provides a storage medium including computer-executable instructions. When executed by a computer processor, the computer-executable instructions cause the processor to perform a data transmission method. The data transmission method is applied to a second communication node. The method includes receiving a paging message carrying first indication information and sent by a first communication node, where the first indication information is used for indicating whether the second communication node is triggered to perform an MT-EDT procedure, and sending an RRC message carrying second indication information to the first communication node.

An embodiment of the present application further provides a storage medium including computer-executable instructions. When executed by a computer processor, the computer-executable instructions cause the processor to perform a data transmission method. The data transmission method is applied to a second communication node. The method includes receiving a paging message carrying third indication information and sent by a first communication node. The third indication information includes an access network type indication and a core network type indication.

An embodiment of the present application further provides a storage medium including computer-executable instructions. When executed by a computer processor, the computer-executable instructions cause the processor to perform an information determination method. The method includes determining a corresponding WUS group resource index for each WUS group index based on a preset rule and according to the number of radio frames, a radio frame index, a superframe index, and the number of WUS group resources.

It is to be understood by those skilled in the art that the term user device encompasses any appropriate type of radio user devices, such as a mobile phone, a portable data processing apparatus, a portable web browser, or a vehicle-mounted mobile station.

In general, multiple embodiments of the present application may be implemented in hardware, a dedicated circuit, software, logic, or any combination thereof. For example, some aspects may be implemented in hardware while other aspects may be implemented in firmware or software that may be performed by a controller, a microprocessor, or other computing apparatuses, although the present application is not limited thereto.

Embodiments of the present application may be implemented by computer program instructions executed by a data processor of a mobile apparatus, for example, in a processor entity, may be implemented by hardware, or may be implemented by a combination of software and hardware. The computer program instructions may be assembly instructions, instruction set architecture (ISA) instructions, machine instructions, machine-related instructions, microcode, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps with logic circuits, modules, and functions. Computer programs may be stored in a memory. The memory may be of any type suitable for a local technical environment and may be implemented using any suitable data storage technology, such as, but not limited to, a read-only memory (ROM), a random-access memory (RAM) and an optical memory device and system (digital video disc (DVD) or compact disc (CD)). Computer-readable media may include non-transitory storage media. The data processor may be of any type suitable for the local technical environment, such as, but is not limited to, a general-purpose computer, a special-purpose computer, a microprocessor, a digital signal processor (DSP), an application specific integrated circuit (ASIC), a field-programmable gate array (FPGA), and a processor based on a multi-core processor architecture.

What is claimed is:

1. A data transmission method, applied to a first communication node, comprising:
   sending a paging message, carrying first indication information, to a second communication node, wherein the first indication information is used for indicating whether to trigger the second communication node to perform a mobile terminal-early data transmission (MT-EDT) procedure; and
   receiving, corresponding to the second communication node being triggered to perform the MT-EDT procedure, a radio resource control (RRC) message carrying second indication information associated with the MT-EDT procedure, the RRC message being received from the second communication node, wherein the second indication information is indicated through a cause value and the second indication information is used for indicating that the second communication node requests for the MT-EDT procedure.

2. The method according to claim 1, wherein the second indication information is used for indicating that the second communication node requests for entering a connected state.

3. A non-transitory computer-readable medium, storing computer-executable programs, the computer-executable programs, when executed by a processor, causing a transmission node to perform the method of claim 1.

4. The non-transitory computer-readable medium according to claim 3, wherein the second indication information is used for indicating that the second communication node requests for entering a connected state.

5. A data transmission method, applied to a second communication node, comprising:
   receiving a paging message, carrying first indication information, from a first communication node, wherein the first indication information is used for indicating whether the second communication node is triggered to perform a mobile terminal-early data transmission (MT-EDT) procedure; and
   sending, corresponding to the second communication node being triggered to perform the MT-EDT procedure, a radio resource control (RRC) message, carrying second indication information associated with the MT-EDT procedure, to the first communication node, wherein the second indication information is indicated through a cause value and the second indication information is used for indicating that the second communication node requests for the MT-EDT procedure.

6. The method according to claim 5, wherein the second indication information is used for indicating that the second communication node requests for entering a connected state.

7. A non-transitory computer-readable medium, storing computer-executable programs, the computer-executable programs, when executed by a processor, causing a transmission node to perform the method of claim 5.

8. The non-transitory computer-readable medium according to claim 7, wherein the second indication information is used for indicating that the second communication node requests for entering a connected state.

9. A data transmission apparatus configured as a first communication node, the data transmission apparatus comprising:
   one or more processors; and
   a memory, configured to store a computer-executable program, the computer-executable program, when executed by the one or more processors, causing the data transmission apparatus to:
   send a paging message, carrying first indication information, to a second communication node, wherein the first indication information is used for indicating whether to trigger the second communication node to perform a mobile terminal-early data transmission (MT-EDT) procedure; and
   receive, corresponding to the second communication node being triggered to perform the MT-EDT procedure, a radio resource control (RRC) message carrying second indication information associated with the MT-EDT procedure, the RRC message being received from the second communication node, wherein the second indication information is indicated through a cause value and the second indication information is used for indicating that the second communication node requests for the MT-EDT procedure.

10. The data transmission apparatus according to claim 9, wherein the second indication information is used for indicating that the second communication node requests for entering a connected state.

11. A data transmission apparatus configured as a second communication node, the data transmission apparatus comprising:

one or more processors; and a memory, configured to store a computer-executable program, the computer-executable program, when executed by the one or more processors, causing the data transmission apparatus to:

receive a paging message, carrying first indication information, from a first communication node, wherein the first indication information is used for indicating whether the second communication node is triggered to perform a mobile terminal-early data transmission (MT-EDT) procedure; and send, corresponding to the second communication node being triggered to perform the MT-EDT procedure, a radio resource control (RRC) message, carrying second indication information associated with the MT-EDT procedure, to the first communication node, wherein the second indication information is indicated through a cause value and the second indication information is used for indicating that the second communication node requests for the MT-EDT procedure.

12. The data transmission apparatus according to claim 11, wherein the second indication information is used for indicating that the second communication node requests for entering a connected state.

* * * * *